US012763612B2

(12) United States Patent
Hiramatsu

(10) Patent No.: US 12,763,612 B2
(45) Date of Patent: Oct. 13, 2026

(54) POWER TRANSMISSION DEVICE, CONTROL METHOD FOR POWER TRANSMISSION DEVICE, AND STORAGE MEDIUM

(71) Applicant: CANON KABUSHIKI KAISHA, Tokyo (JP)

(72) Inventor: Tomoki Hiramatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/234,093

(22) Filed: Jun. 10, 2025

(65) Prior Publication Data

US 2025/0309697 A1 Oct. 2, 2025

Related U.S. Application Data

(63) Continuation of application No. PCT/JP2023/043020, filed on Nov. 30, 2023.

(30) Foreign Application Priority Data

Dec. 15, 2022 (JP) ................................ 2022-200184

(51) Int. Cl.
*H02J 50/60* (2016.01)
*H02J 50/10* (2016.01)
*H02J 50/40* (2016.01)
*H02J 50/80* (2016.01)

(52) U.S. Cl.
CPC .............. *H02J 50/60* (2016.02); *H02J 50/10* (2016.02); *H02J 50/40* (2016.02); *H02J 50/80* (2016.02)

(58) Field of Classification Search
CPC .. H02J 50/60; H02J 50/80; H02J 50/10; H02J 50/40
See application file for complete search history.

(56) References Cited

U.S. PATENT DOCUMENTS

| | | | |
|---|---|---|---|
| 2016/0197513 A1 | 7/2016 | Uchimoto et al. | |
| 2018/0090954 A1 | 3/2018 | Graham et al. | |
| 2021/0281125 A1 | 9/2021 | Sato | |
| 2023/0122918 A1 | 4/2023 | Shimura | |

FOREIGN PATENT DOCUMENTS

| | | | | |
|---|---|---|---|---|
| CN | 115039312 A | * | 9/2022 | ............. H02J 50/90 |
| JP | 2015056959 A | | 3/2015 | |
| JP | 2018186699 A | | 11/2018 | |
| JP | 2020089135 A | | 6/2020 | |
| JP | 2022020085 A | | 2/2022 | |

* cited by examiner

*Primary Examiner* — Robert L Deberadinis
(74) *Attorney, Agent, or Firm* — Canon U.S.A., Inc. IP Division

(57) ABSTRACT

A power transmission device 100 includes a plurality of power transmission coils 209 and a near-field communication (NFC) antenna 213. At least one NFC antenna 213 is disposed in each power transmission area corresponding to a power transmission coil group. The power transmission device 100 stops a power transmission process of S704 in a case where the NFC antenna 213 by which an NFC tag has been detected is an NFC antenna disposed in the power transmission area in which power transmission is being performed using the power transmission coils 209.

12 Claims, 11 Drawing Sheets

POWER TRANSMISSION DEVICE, CONTROL METHOD FOR POWER TRANSMISSION DEVICE, AND STORAGE MEDIUM

CROSS-REFERENCE TO RELATED APPLICATIONS

This application is a Continuation of International Patent Application No. PCT/JP2023/043020, filed Nov. 30, 2023, which claims the benefit of Japanese Patent Application No. 2022-200184, filed Dec. 15, 2022, both of which are hereby incorporated by reference herein in their entirety.

BACKGROUND

Field

The present disclosure relates to a technique of wireless power transfer.

Description of the Related Art

A standard established as a wireless charging standard by the standardization organization, the Wireless Power Consortium (hereinafter referred to as a WPC standard), is widely known. In Japanese Unexamined Patent Application Publication No. 2015-56959, a power transmission device and a power reception device based on the WPC standard are disclosed. In the WPC standard, power transmission and reception and control communication therefor are performed using magnetic induction.

A near-field communication (NFC) system is known as a kind of wireless communication system. An NFC tag does not include a battery and is driven with energy of electromagnetic waves which are transmitted at the time of communication from a communication partner. In a case where the aforementioned wireless power transfer is performed on the NFC tag, it is necessary to avoid damage of an antenna element or the like of the NFC tag.

In the WPC standard, a power transmission device detects an NFC tag through communication based on a standard for NFC (an NFC standard) in parallel with a process associated with power transmission or reception. Whether to stop power transmission or reception is determined on the basis of the result of detection of the NFC tag. Japanese Unexamined Patent Application Publication No. 2018-186699 discloses a wireless charging mat that includes a plurality of power transmission coils and can efficiently charge an electronic device using most of a charging surface thereof.

In the related art, in a case where a power transmission device includes a plurality of power transmission coils, control for appropriately performing tag detection is not satisfactorily established. In the WPC standard, an appropriate control method in a case where an NFC tag is detected in association with a power transmission device including a plurality of power transmission coils has not been studied yet. Accordingly, there is a likelihood that control for stopping or limiting power transmission or reception will be unnecessarily performed according to a position at which a power reception device or an NFC tag is placed on the power transmission device or a power transmission or reception state.

SUMMARY

A power transmitting apparatus of the present disclosure includes a power transmitting unit configured to perform power transmission using a plurality of power transmission coils; a first detection unit configured to detect a power reception device using a power transmission coil included in the plurality of power transmission coils; a communication antenna disposed in an area in which power transmission is possible using the power transmission coil; a second detection unit configured to detect a device able to communicate via the communication antenna; and a control unit configured to control power transmission from the power transmitting unit using the power transmission coil by which the power reception device has been detected. The control unit performs control to limit power transmission from the power transmitting unit in a case where power transmission to the power reception device is being performed via the power transmission coil in the area in which the cantenna with which the device has been detected by the second detection unit is disposed.

Further features of the present disclosure will become apparent from the following description of embodiments with reference to the attached drawings.

DESCRIPTION OF THE EMBODIMENTS

Hereinafter, embodiments of the present disclosure will be described in detail with reference to the accompanying drawings. An example of a wireless power transfer system based on the WPC standard will be described, and a near-field communication (NFC) tag will be described as an example of an electronic tag. All of a plurality of features in embodiments of the present disclosure are not essential to the present disclosure, and a plurality of features may be arbitrarily combined.

First Embodiment

Figure 1:
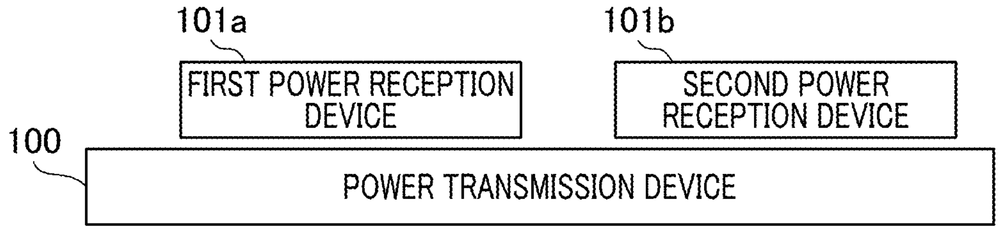
FIG. 1 is a diagram illustrating an example of a configuration of a wireless power transfer system according to an embodiment.

FIG. 1 is a diagram illustrating an example of a configuration of a wireless power transfer system according to a first embodiment. The wireless power transfer system according to the present embodiment includes a power transmission device 100 and a power reception device 101. In FIG. 1, a first power reception device 101*a* and a second power reception device 101*b* are illustrated as the power reception device.

The power transmission device 100 has a function of simultaneously charging the first power reception device 101*a* and the second power reception device 101*b* which are placed in a power-transmittable range thereof. In FIG. 1, an example in which two power reception devices are placed on the power transmission device is illustrated, but the present disclosure is not limited thereto. For example, the power transmission device 100 can charge one power reception device. Alternatively, the power transmission device 100 can simultaneously charge three or more power reception devices.

In the present embodiment, a state (hereinafter referred to as a "placed state") in which a power reception device is placed on a power transmission device includes the following states. For example, the placed state includes a state in which a power reception device is installed on a surface in a power-transmittable range of a power transmission device.

A method described in the present embodiment can be applied at least in a state in which a power reception device is included in a power-transmittable range of a power transmission device. For example, the power reception device and the power transmission device may be in a non-contact state.

The surface of the power transmission device on which the power reception device is placed in the placed state is not limited to a horizontal plane and may be a vertical plane, a tilted plane, or a curved surface. In the following description, in order to simplify the notation, a power transmission device may be referred to as a TX, and a power reception device may be referred to as an RX. Detailed configurations of the TX and the RX will be described later with reference to FIGS. 2 and 3.

In the wireless power transfer system, wireless power transfer using an electromagnetic induction system for non-contact charging is performed on the basis of the WPC standard. The RX and the TX perform wireless power transfer for non-contact charging between a power reception coil of the RX and a power transmission coil of the TX.

The wireless power transfer system (a non-contact power transfer system) is not limited to the system specified in the WPC standard, and another electromagnetic induction system, a magnetic resonance system, an electric resonance system, a microwave system, a system using a laser, or the like may be used. In the present embodiment, wireless power transfer is used for the non-contact charging, and the wireless power transfer may be performed as an application other than the non-contact charging.

In the WPC standard, a magnitude of power which is guaranteed in a case where the RX receives power from the TX is defined by a value of guaranteed power (hereinafter referred to as "GP"). The GP indicates a power value which is guaranteed to be output to a load of the RX such as a charging circuit even in a case where a positional relationship between the RX and the TX changes and power transmission efficiency between the power reception coil and the power transmission coil decreases.

For example, the GP value is 15 (watts). In this case, even in a case where the positional relationship between the power reception coil and the power transmission coil changes and the power transmission efficiency decreases, the TX transmits power to the RX by performing control such that 15 watts can be output to a load in the RX. The GP is determined through negotiation between the RX and the TX.

In the WPC standard, methods of allowing a TX to detect that an object other than a power reception device is present in a surrounding environment of the TX (such as in the vicinity of a power transmission coil) are specified. This object may be referred to as a foreign object. More specifically, a first method is a foreign object detection method based on a change of a quality factor (Q-value, Q-factor) associated with a power transmission coil in a TX.

A second method (a power loss method) is a foreign object detection method based on a difference between transmitted power of the TX and received power of the RX. The first method is performed before power transfer (in a negotiation phase or a renegotiation phase). The second method is performed during power transfer (in a power transfer phase) on the basis of data on which a calibration process has been performed.

On the other hand, a plurality of components constituting an RX (and a product into which the RX has been assembled) or a TX (and a product into which the TX has been assembled) may include essential metal components. There are metal components which may unintentionally generate heat in a case where they are exposed to power of wireless power transmission using a power transmission coil.

Such metal components include, for example, a metal frame near power transmission coils or power reception coils. A foreign object in the present disclosure is an object that is not any of a part of a power reception device and a product into which the power reception device has been assembled and a part of a power transmission device and a product into which the power transmission device has been assembled and that can generate heat in a case where it is exposed to a power signal which is transmitted by the power transmission coil.

An object of an essential part of a power reception device and a product into which the power reception device has been assembled or an object of an essential part of a power transmission device and a product into which the power transmission device has been assembled does not correspond to the foreign object. For example, a clip corresponds to the foreign object.

Communication for power transmission/reception control and communication for device authentication based on the WPC standard are included in communication between an RX and a TX. Here, communication for power transmission/reception control based on the WPC standard will be described.

In the WPC standard, a plurality of phases including a power transfer phase in which power transfer is performed and a phase before power transfer are specified, and necessary communication for power transmission/reception control is performed in the phases. Such various phases will be described below.

Phases before power transfer include a ping phase, a configuration phase, a negotiation phase, and a calibration phase. In the ping phase, a TX intermittently transmits an analog ping and detects that an object is present in a power-transmittable range.

The analog ping is hereinafter referred to as an AP. For example, a TX can detect that a power reception device 101, a conductor piece, or the like is placed on the power transmission device 100 by transmission of an AP. Thereafter, the TX transmits a digital ping with a higher power than that of the AP.

The digital ping is hereinafter referred to as a DP. The DP has a power which is sufficient for a control unit of an RX placed on the TX to start. The RX notifies the TX of a magnetic of a received voltage using a signal strength packet.

In this way, the TX recognizes that an object detected using the AP is an RX by receiving a response from the RX having received the DP. In a case where the TX receives a notification indicating the magnitude of the received voltage from the RX, the TX transitions to the configuration phase.

Before transmitting the DP, the TX measures a quality factor (a Q-value, a Q-factor) associated with the power transmission coils. This measurement result is used to perform a foreign object detecting process on the basis of a Q-value measurement method. In the configuration phase, the TX identifies the RX and acquires device configuration information (capacity information) from the RX.

Accordingly, the RX transmits an ID packet and a configuration packet to the TX. Identification information of the RX is included in the ID packet, and device configuration information (capacity information) of the RX is included in the configuration packet.

The TX having received the ID packet and the configuration packet transmits an acknowledgement (ACK) to the RX as a response. Then, the configuration phase ends.

In the negotiation phase, the GP value is determined on the basis of a GP value required by the RX, a power transmission capacity of the TX, or the like. The TX performs the foreign object detecting process on the basis of a Q-value measuring method in response to a request from the RX.

In the WPC standard, a method of performing the same process as in the negotiation phase again in response to a request from the RX after temporarily transitioning to the power transfer phase is specified. The phase to which the power transfer phase transitions and in which the process is performed is referred to as a renegotiation phase.

In the calibration phase based on the WPC standard, the RX notifies the TX of a predetermined received power value, and the TX performs adjustment for efficient power transmission. The predetermined received power value is, for example, a received power value in a light load state or a received power value in a maximum load state. The TX can use the received power value notified by the RX for the foreign object detecting process on the basis of a power loss method.

In the power transfer phase, continuation of power transmission and control for processing an error, stopping power transmission due to full charging, or the like are performed. The TX and the RX perform communication for power transmission/reception control through in-band communication in which a signal is superimposed using the same antenna (coil) as in wireless power transfer on the basis of the WPC standard.

An in-band range in which communication is possible based on the WPC standard between the TX and the RX almost matches the power-transmittable range.

Figure 2:
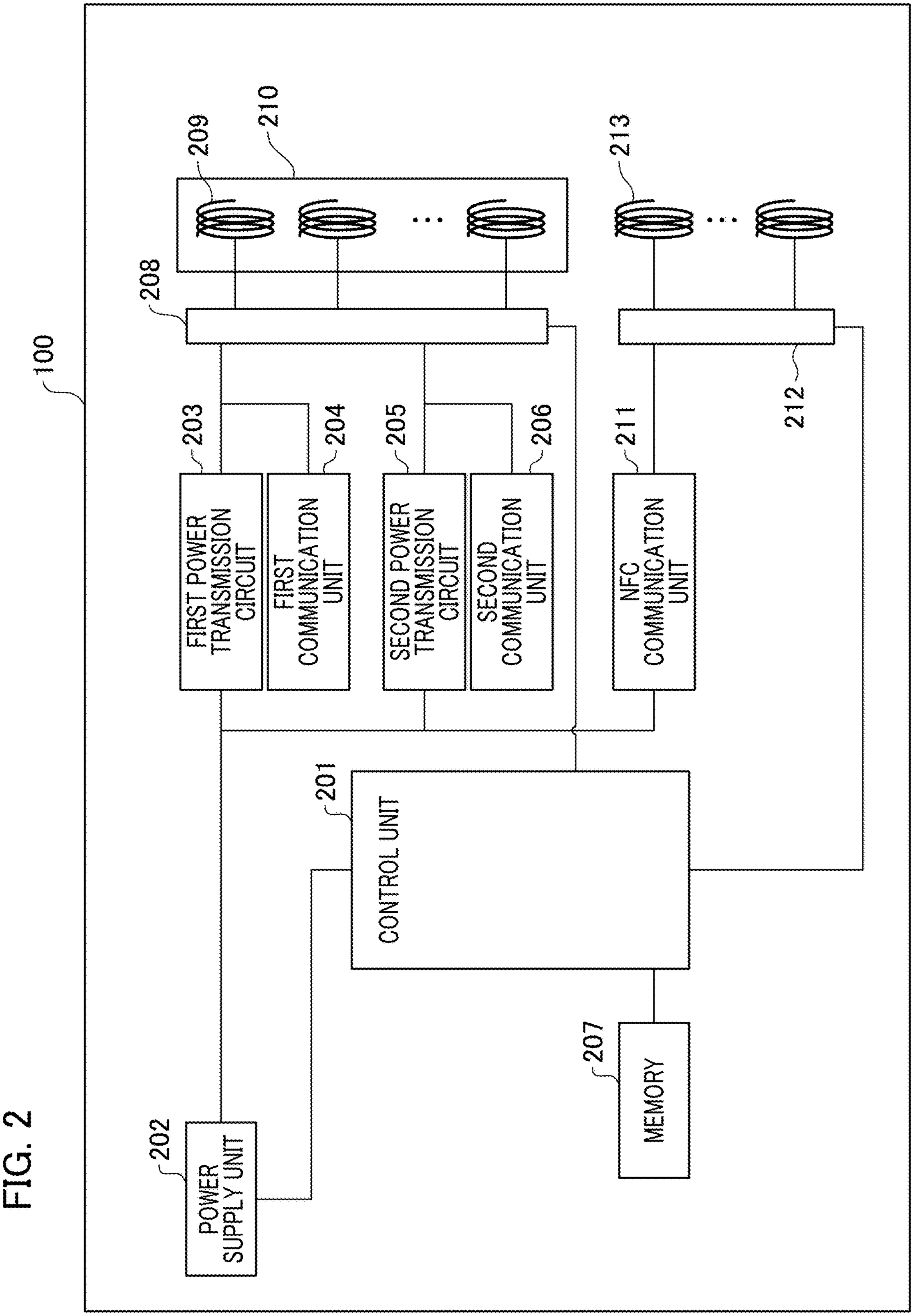
FIG. 2 is a block diagram illustrating an example of a configuration of a power transmission device.

Functional configurations of the TX and the RX will be described below. FIG. 2 is a block diagram illustrating the functional configuration of a power transmission device 100 (TX). The power transmission device 100 includes a control unit 201, a power supply unit 202, a first power transmission circuit 203, a first communication unit 204, a second power transmission circuit 205, a second communication unit 206, a memory 207, and a power transmission coil selecting unit 208.

The power transmission device 100 further includes a power transmission coil group 210, an NFC communication unit 211, an NFC antenna selecting unit 212, and an NFC antenna 213.

The power transmission coil group 210 includes a plurality of power transmission coils 209*a*, 209*b*, . . . . The TX includes a plurality of NFC antennas 213*a*, 213*b*, . . . . In the following description, a plurality of power transmission coils or a plurality of NFC antennas are referred to as power transmission coils 209 or NFC antennas 213 in a case where they do not need to be distinguished.

The control unit 201 controls the power transmission device 100 as a whole. The control unit 201 includes, for example, one or more processors such as a central processing unit (CPU) or a micro-processing unit (MPU). The control unit 201 may include an application-specific integrated circuit (ASIC) or a field-programmable gate array (FPGA) which is configured to perform processes which will be described later.

The power supply unit 202 includes a power supply that supplies power for operation of the control unit 201, the first power transmission circuit 203, the second power transmission circuit 205, and the NFC communication unit 211. The power supply unit 202 includes, for example, a wired power reception circuit or a battery which is supplied with power from a commercial power supply.

The first power transmission circuit 203 and the second power transmission circuit 205 generate an AC voltage and an AC current in an arbitrary power transmission coil 209 included in the power transmission coil group 210. For example, the first power transmission circuit 203 and the second power transmission circuit 205 convert a DC voltage supplied from the power supply unit 202 to an AC voltage using a switching circuit having a half-bridge or full-bridge structure using a field effect transistor (FET).

In this case, the first power transmission circuit 203 and the second power transmission circuit 205 include a gate driver for controlling ON/OFF of the FET.

The first communication unit 204 performs control communication for wireless power transfer based on the WPC standard with a communication unit (303 in FIG. 3) of a power reception device in accordance with a control command from the control unit 201. For example, the first communication unit 204 performs load modulation of an AC voltage or an AC current generated by the first power transmission circuit 203 and transmits a signal of communication data to the power reception device by superimposing the signal of communication data on power transmission waves (electromagnetic waves).

The first communication unit 204 receives the signal of communication data transmitted from the power reception device by demodulating the AC voltage or the AC current modulated by the communication unit (303 in FIG. 3) of the power reception device.

Through this process, control communication for wireless power transfer based on the WPC standard is realized. The second communication unit 206 realizes the control communication by modulating or demodulating a load of the AC voltage or the AC current generated by the second power transmission circuit 205 and transmitting and receiving communication data in accordance with a control command from the control unit 201 similarly to the first communication unit 204.

The memory 207 is connected to the control unit 201 and stores information on states of the constituents and the whole state of the power transmission device 100 or the wireless power transfer system. For example, the memory

207 stores identification information of a plurality of power transmission coils and NFC antennas required for power transmission control and communication control, identification information of a power transmission area which will be described later, or the like.

One or more arbitrary power transmission coils out of a plurality of power transmission coils 209 constituting the power transmission coil group 210 are connected to the first power transmission circuit 203 or the second power transmission circuit 205 via the power transmission coil selecting unit 208.

The power transmission coil selecting unit 208 connects one or more arbitrary power transmission coils constituting the power transmission coil group 210 to the first power transmission circuit 203 or the second power transmission circuit 205 in accordance with a control command from the control unit 201.

The control unit 201 can control the power transmission coil selecting unit 208 such that the first power transmission circuit 203 or the second power transmission circuit 205 is connected to one or more arbitrary power transmission coils. Switching of connection between the first power transmission circuit 203 and the second power transmission circuit 205 and the power transmission coils which is performed by the power transmission coil selecting unit 208 which will be described later.

The first power transmission circuit 203 and the second power transmission circuit 205 according to the present embodiment can operate independently to simultaneously transmit power for charging one power reception device to the maximum. That is, the power transmission device 100 can simultaneously charge two power reception devices to the maximum.

The NFC communication unit 211 performs communication with another NFC device using an NFC system which is a short-range wireless communication system. It is assumed that the other NFC device includes an NFC tag. The power transmission device 100 can detect presence of an NFC tag using the NFC communication unit 211.

The NFC communication unit 211 is connected to one or more arbitrary NFC antennas via the NFC antenna selecting unit 212. The control unit 201 determines to what NFC antenna 213 the NFC communication unit 211 is to be connected by controlling the NFC antenna selecting unit 212. The NFC antenna selecting unit 212 switches connection between the NFC communication unit 211 and the NFC antenna 213 in accordance with a control command from the control unit 201.

In the example illustrated in FIG. 2, the constituent units are illustrated as separate block elements. The constituent units are the control unit 201, the power supply unit 202, the first power transmission circuit 203, the first communication unit 204, the second power transmission circuit 205, the second communication unit 206, the memory 207, the power transmission coil selecting unit 208, the power transmission coil group 210, the NFC communication unit 211, and the NFC antenna selecting unit 212.

The present disclosure is not limited to that example, and two or block elements may be incorporated into one chip or the like and one block element may be divided into a plurality of block elements.

Figure 3:
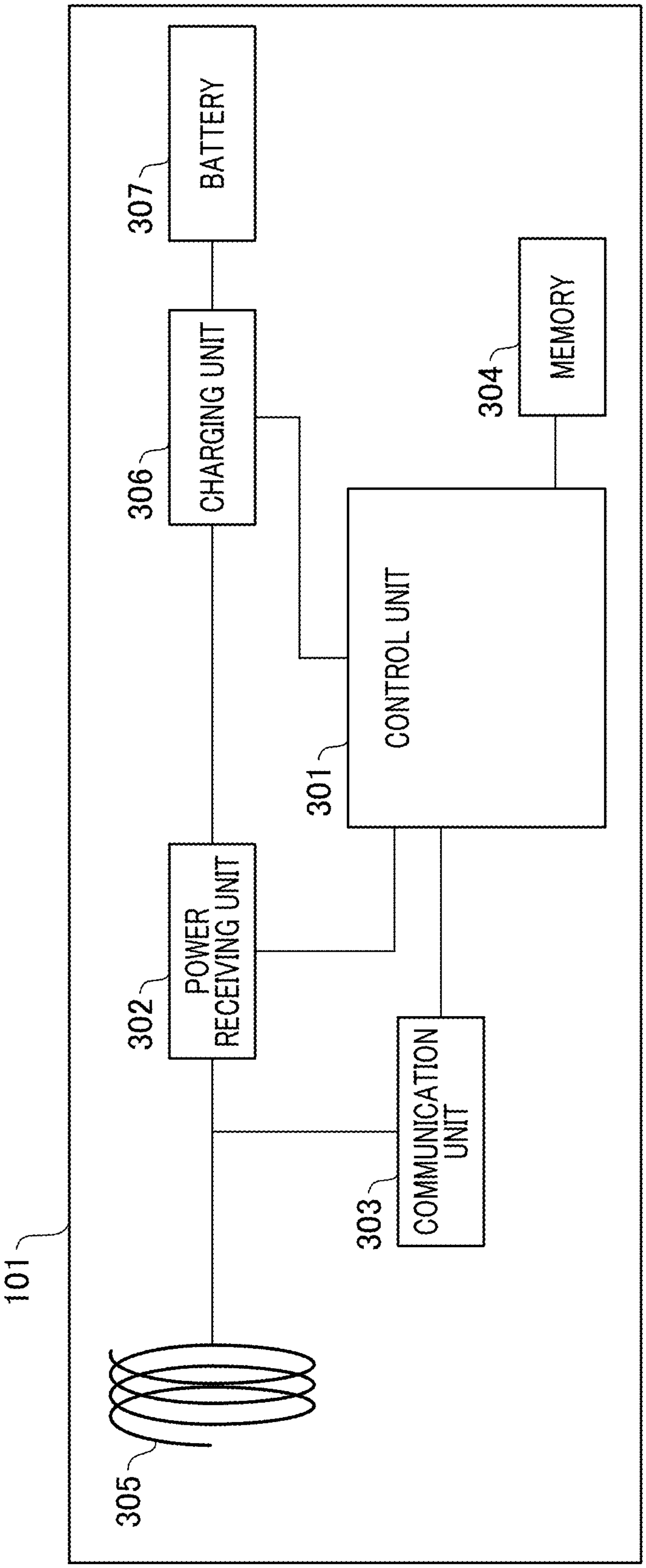
FIG. 3 is a block diagram illustrating an example of a configuration of a power reception device.

FIG. 3 is a block diagram illustrating the functional configuration of the RX (the first power reception device 101*a* and the second power reception device 101*b*). In the present embodiment, the first power reception device 101*a* and the second power reception device 101*b* have the same functional configuration.

The power reception devices are simply referred to as a power reception device 101 in a case where they are not distinguished. Here, the first power reception device 101*a* and the second power reception device 101*b* may be different types of devices. The power reception device 101 illustrated in FIG. 3 includes a control unit 301, a power receiving unit 302, a communication unit 303, a memory 304, a power reception coil 305, a charging unit 306, and a battery 307.

The control unit 301 controls the power reception device 101 as a whole. The control unit 301 includes, for example, one or more processors such as a CPU or an MPU. The control unit 301 may include an ASIC or an FPGA configured to perform processes which will be described later. The control unit 301 can start by receiving predetermined power from the power transmission device 100.

The power receiving unit 302 receives an AC voltage and an AC current generated in the power reception coil 305 from an arbitrary power transmission coil 209 constituting the power transmission coil group 210. The power receiving unit 302 converts the AC voltage and the AC current to a DC voltage and a DC current for operation of the control unit 301, the charging unit 306, and the like.

The communication unit 303 performs control communication for wireless power transfer based on the WPC standard with the first communication unit 204 or the second communication unit 206 of the power transmission device 100 in accordance with a control command from the control unit 301.

The communication unit 303 transmits communication data to the power transmission device 100 by modulating the AC voltage and the AC current received by the power reception coil 305. The communication unit 303 receives communication data transmitted from the power transmission device 100 by demodulating an AC voltage and an AC current modulated by the power transmission device 100.

The charging unit 306 charges the battery 307 on the basis of a DC voltage and a DC current supplied from the power receiving unit 302. The memory 304 is connected to the control unit 301 and stores information indicating states of the block elements or the whole state of the power reception device 101 or the wireless power transfer system.

In the example illustrated in FIG. 3, the control unit 301, the power receiving unit 302, the communication unit 303, the memory 304, and the charging unit 306 are illustrated as independent block elements. The present disclosure is not limited to this example, and two or more block elements may be integrated into one chip or the like or one block element may be divided into a plurality of block elements.

The power reception device 101 and the power transmission device 100 according to the present embodiment can have a function of executing an application in addition to a charging function through wireless power transfer. For example, the power reception device 101 is a smartphone, and the power transmission device 100 is an accessory device for charging the battery of the smartphone (the power reception device 101).

Alternatively, the power reception device 101 and the power transmission device 100 may be a storage device such as a hard disk device or a memory device or may be an information processing device such as a personal computer (PC). The power reception device 101 and the power transmission device 100 may be, for example, an image input device such as an imaging device (such as a still camera or a video camera) or a scanner or may be an image output device such as a printer, a copier, or a projector.

Alternatively, the power transmission device 100 may be a smartphone. In this case, the power reception device 101 may be another smartphone or a wireless earphone. The power transmission device 100 may be a charger that is installed in a console of a vehicle or the like.

An arrangement configuration of the power transmission coil group 210 of the power transmission device 100 will be described with reference to FIGS. 4A to 4D. FIGS. 4A to 4D schematically illustrate a state in a top view of the power transmission coil group 210 and illustrate arrangement examples of a plurality of power transmission coils on a two-dimensional plane (an xy plane).

Here, a plurality of actual power transmission coils can also be arranged in a three-dimensional space including a height direction (a z direction). Power transmission coils 400 to 411 correspond to a plurality of power transmission coils 209 constituting the power transmission coil group 210.

Figure 4A:
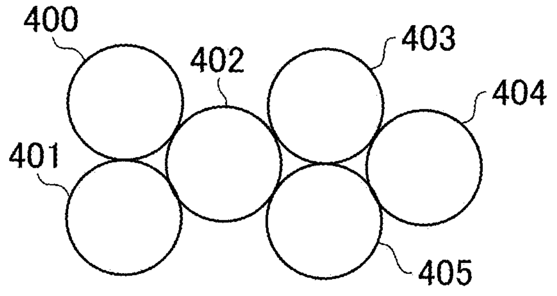
FIGS. 4A to 4D are diagrams illustrating examples of an arrangement configuration of a power transmission coil group.

FIGS. 4A to 4D are diagrams illustrating a state in a top view of a part of the power transmission coil group 210. In FIG. 4A, an arrangement example of six circular coils is illustrated as the power transmission coils 400 to 405. The power transmission coils 400, 401, and 402 are arranged such that a circumference part thereof is in partial contact with two other power transmission coils.

Similarly, the power transmission coils 403, 404, and 405 are arranged such that a circumference part thereof is in partial contact with two other power transmission coils. Similarly, the power transmission coils 402, 403, and 405 are arranged such that a circumference part thereof is in partial contact with two other power transmission coils.

Figure 4B:
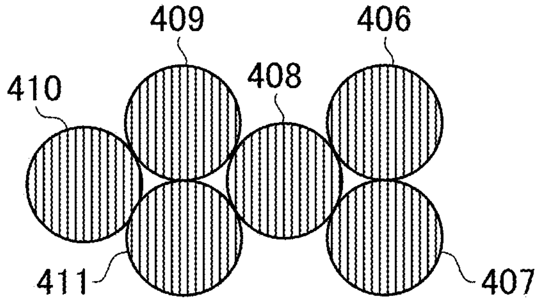

FIG. 4B illustrates an arrangement example of six circular coils as the power transmission coils 406 to 411. The arrangement of the power transmission coils 406 to 411 illustrated in FIG. 4B corresponds to an arrangement obtained by laterally inverting the arrangement of the power transmission coils 400 to 405 illustrated in FIG. 4A.

The power transmission coils 406 to 411 are illustrated by adding hatching lines (vertical lines) in a circle corresponding to each power transmission coil for the purpose of convenience in order to distinguish them from the power transmission coils 400 to 405. The same is true of FIGS. 4C and 4D.

In FIG. 4B, the power transmission coils 409, 410, and 411 are arranged such that a circumference part thereof is in partial contact with two other power transmission coils. Similarly, the power transmission coils 406, 407, and 408 are arranged such that a circumference part thereof is in partial contact with two other power transmission coils.

Similarly, the power transmission coils 408, 409, and 411 are arranged such that a circumference part thereof is in partial contact with two other power transmission coils.

Figure 4C:
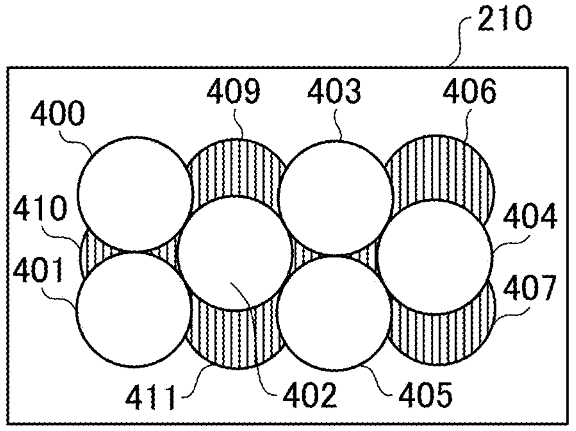

FIG. 4C is a diagram illustrating a state in a top view of the whole power transmission coil group 210. The power transmission coil group 210 has a configuration in which the power transmission coils 400 to 405 illustrated in FIG. 4A are superimposed on the power transmission coils 406 to 411 illustrated in FIG. 4B.

Figure 4D:
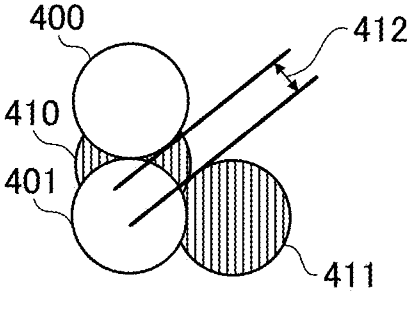

FIG. 4D is a diagram illustrating a positional relationship between a part (the power transmission coils 400, 401, 410, and 411) of the power transmission coil group 210. Since the power transmission coil 400 and the power transmission coil 410 are superimposed in a top view and the power transmission coil 401 and the power transmission coil 410 are superimposed in a top view, these power transmission coils are said to "overlap each other."

On the other hand, the power transmission coil 400 and the power transmission coil 411 are not superimposed in a top view. A distance 412 indicates a distance (denoted by D) between an outer part of the power transmission coil 400 and an outer part of the power transmission coil 411. That is, the power transmission coil 400 and the power transmission coil 411 are separated by the distance D in a top view.

Out of a plurality of power transmission coils adjacent to each other, a first power transmission coil is referred to as a coil A, and a second power transmission coil is referred to as a coil B. Electromagnetic waves associated with transmitted power of the coil A and an in-band communication signal transmitted and received between the communication units of the TX and the RX may be superimposed on electromagnetic waves associated with transmitted power of the coil B and an in-band communication signal transmitted and received between the communication units of the TX and the RX.

This phenomenon is referred to as "interference" in the present disclosure. Interference between a plurality of power transmission coils and non-interference therebetween are defined as follows. In a case where the coil A satisfies Condition (1) or (2) with respect to the coil B, the two power transmission coils are said to "not interfere with each other."

(1) Fluctuation in voltage amplitude or current amplitude or fluctuation in frequency of a modulation signal transmitted and received by the coil A is not observed from the coil B.

(2) Fluctuation in voltage amplitude or current amplitude or fluctuation in frequency of a modulation signal transmitted and received by the coil A is observed from the coil B, and an observed level is equal to or less than a predetermined value (a threshold value) and does not affect demodulation performance in a case where the communication unit demodulates the modulation signal in the coil B.

Definition that two power transmission coils "interfere with each other" can be derived from negative conditions of Condition (1) and Condition (2). In a case where Condition (3) is satisfied, it is represented that two power transmission coils "interfere with each other."

(3) Fluctuation in voltage amplitude or current amplitude or fluctuation in frequency of a modulation signal transmitted and received by the coil A is observed from the coil B, and an observed level is equal to or greater than the predetermined value (the threshold value) and affects demodulation performance in a case where the communication unit demodulates the modulation signal in the coil B.

Out of power transmission coils which are electromagnetically coupled (that is, a coupling coefficient of which is not zero), a first power transmission coil is referred to as a coil A, and a second power transmission coil is referred to as a coil B. In a case where the coil A satisfies Condition (4) or (5) with respect to the coil B, the two power transmission coils are said to "not interfere with each other."

(4) A high-frequency voltage or a high-frequency current applied to the coil A or a voltage based on fluctuation in the high-frequency voltage or the high-frequency current or fluctuation in frequency is not caused in the coil B.

(2) A high-frequency voltage or a high-frequency current applied to the coil A or a voltage level caused in the coil B based on fluctuation in the high-frequency voltage or the high-frequency current or fluctuation in frequency is equal to or less than a predetermined value (a threshold value).

In a case where Condition (6) is satisfied, it is represented that two power transmission coils "interfere with each other."

(6) A high-frequency voltage or a high-frequency current applied to the coil A or a voltage level caused in the coil B based on fluctuation in the high-frequency voltage or the high-frequency current or fluctuation in frequency is greater than the predetermined value (the threshold value).

In a case where two power transmission coils interfere with each other, a degree of interference thereof varies depending on a positional relationship between the two power transmission coils. In the present embodiment, it is defined that two power transmission coils do not interfere with each other in a case where they are separated by a predetermined distance D (see 412 in FIG. 4D) or more.

For example, the power transmission coil 400 and the power transmission coil 411 do not interfere with each other. The power transmission coil 400 and the power transmission coil 410 overlap the power transmission coil 401 and the power transmission coil 410, respectively, and are not separated by the distance D or more.

Accordingly, the power transmission coil 400 and the power transmission coil 410 interfere with each other, and the power transmission coil 401 and the power transmission coil 410 interfere with each other. The predetermined value (the threshold value) or the distance D may be defined in the WPC standard.

The predetermined distance D which is used to determine that two power transmission coils do not interference with each other may vary depending on definition of a distance between the power transmission coils. For example, the predetermined distance D may vary in a case where the distance between the power transmission coils is defined as a distance between reference points (for example, the centers of gravity) of the power transmission coils and in a case where the distance is a shortest distance between the power transmission coils.

A plurality of power transmission coils may be arranged on a two-dimensional plane and may also be arranged in a three-dimensional space (for example, in the height direction). According to the present embodiment, in any condition, control which will be described later can be performed on the basis of definition of the predetermined distance D at which interference does not occur according to the same method as described above.

In a case where a plurality of power transmission coils having a predetermined positional relationship simultaneously transmit power as described above, the power transmission coils interfere with each other, and thus there is a likelihood that power transmission from the power transmission coils or control communication will be affected.

Therefore, the power transmission device 100 according to the present embodiment performs control such that power transmission coils do not interfere with each other in a case where the power transmission coils to be connected to the first power transmission circuit 203 and the second power transmission circuit 205 are selected. That is, the control unit 201 causes the power transmission coil selecting unit 208 to perform control for selecting power transmission coils separated by a predetermined distance D or more out of a plurality of power transmission coils. Accordingly, it is possible to perform appropriate power transmission using a plurality of power transmission coils.

Alternatively, there is a method of selecting power transmission coils such that a plurality of power transmission coils do not interfere with each other can be used in addition to the method based on determination of the predetermined distance D. Specifically, the control unit 201 can identify another power transmission coil interfering with power transmission using the first power transmission coil.

The control unit 201 identifies another coil (the second power transmission coil) interfering with power transmission from the first power transmission coil or another coil (a third power transmission coil) not interfering therewith in advance and stores identification information indicating the identified power transmission coil in the memory 207. The control unit 201 selects a third power transmission coil determined not to interfere with the first power transmission coil at the time of selection of the first power transmission coil and performs control of power transmission.

Figure 5:
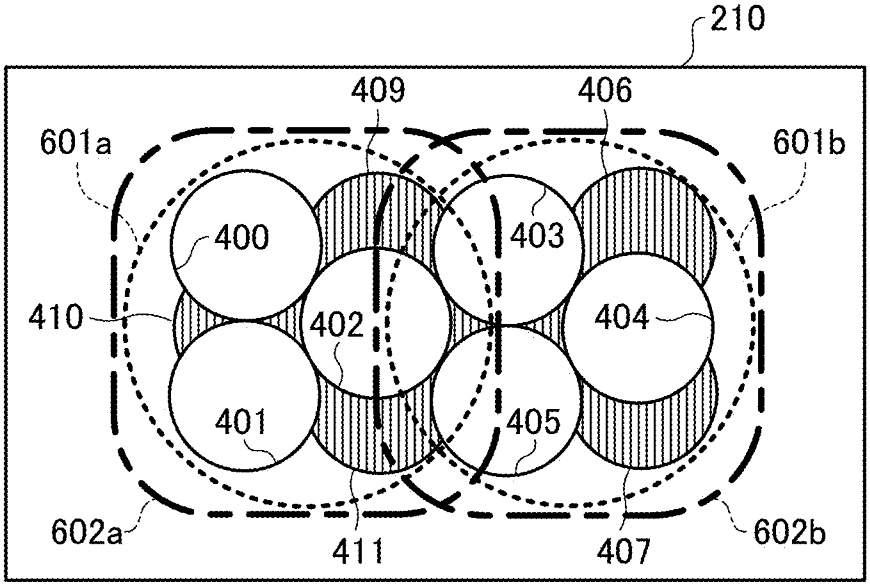
FIG. 5 is a diagram illustrating an example of an arrangement of power transmission coils and NFC antennas according to a first embodiment.

An arrangement example of power transmission coils and NFC antennas according to the present embodiment will be described below with reference to FIG. 5. FIG. 5 is a diagram schematically illustrating an arrangement example of an NFC antenna 602*a* and an NFC antenna 602*b* (see alternated long and short dash lines) with respect to the plurality of power transmission coils illustrated in FIG. 4C.

An example in which first and second areas corresponding to first and second power transmission coil groups are provided as an area in which the TX can perform power transmission using a plurality of power transmission coils will be described. It is assumed that the first power transmission circuit 203 can be connected to the power transmission coils 400, 401, 402, 409, 410, and 411.

Accordingly, the first power transmission circuit 203 can transmit power to a power reception device 101 placed on an area 601*a* indicated by a dotted line. It is assumed that the second power transmission circuit 205 can be connected to the power transmission coils 403, 404, 405, 406, 407, and 408. Accordingly, the second power transmission circuit 205 can transmit power to a power reception device 101 placed on an area 601*b* indicated by a dotted line.

The TX can transmit power to maximum one RX in each area 601*a* or 601*b*. That is, the power transmission device 100 can simultaneously transmit power to a total of two power reception devices.

In the WPC standard, an area corresponding to the areas 601*a* and 601*b* is referred to as an active area. The area is defined as a part through which sufficiently high magnetic flux can pass in a case where the TX supplies power to the RX.

In the present embodiment, according to definition in the WPC standard, the areas 601*a* and 601*b* in which power transmission is possible are referred to as power-transmittable areas or power transmission areas. NFC antennas are disposed in the power transmission coils and the power transmission areas as indicated by alternated long and short dash lines.

In a top view, the NFC antenna 602*a* is disposed to surround the area 601*a* corresponding to a first power transmission area, and the NFC antenna 602*b* is disposed to surround the area 601*b* corresponding to a second power transmission area.

In the present embodiment, in a case where seen in a direction perpendicular to a plane including the power transmission coils, the area 601*a* and the area 601*b* overlap each other. The NFC antennas 602*a* and 602*b* are disposed in areas corresponding to different power transmission coil groups except a part in which the power transmission areas overlap.

Accordingly, it is possible to detect an NFC tag which is independent for each power transmission area and to perform appropriate control in a case where an NFC tag is detected. A control method associated with the detection of an NFC tag will be described later.

Figure 6:
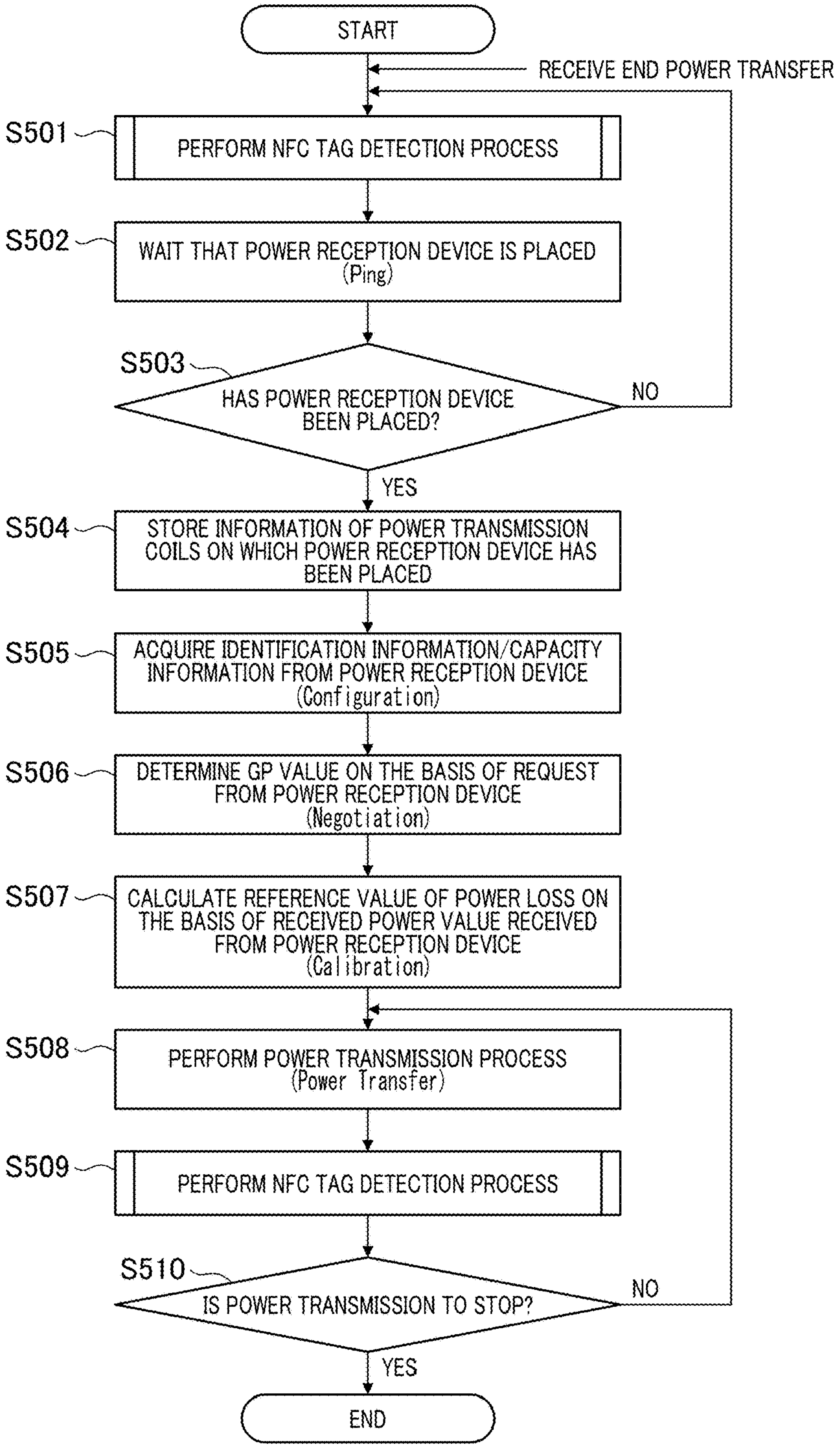
FIG. 6 is a flowchart illustrating a process flow that is performed by a power transmission device according to the embodiment.

A process flow that is performed by the TX will be described below with reference to FIGS. 6 and 7. FIG. 6 is a flowchart illustrating an example of a process flow that is performed by the TX. This process flow is realized, for example, by causing the control unit 201 of the TX to execute a program read from the memory 207.

A part of the following process flow may be realized by hardware. For example, the hardware in this case can automatically generate a dedicated circuit using a gate array circuit such as an FPGA from programs for realizing processing steps using a predetermined compiler.

This process flow is performed in a case where the TX is powered on, in a case where a user of the TX inputs a start instruction of a non-contact charging application, or in a case where the TX is connected to a commercial power supply and supplied with power therefrom.

In S501 of FIG. 6, the TX performs an NFC tag detecting process. This process will be described later. Then, in S502, the TX performs a process specified in the ping phase of the WPC standard and waits for placement of an object on the TX.

In the ping phase, the TX repeatedly intermittently transmits an AP based on the WPC standard and performs a process of detecting an object within a power-transmittable range. At this time, the TX can sequentially transmit the AP from the power transmission coils, but the present disclosure is not limited thereto. For example, the TX may simultaneously transmit the AP from a plurality of power transmission coil groups not interfering with each other.

In this case, the TX can sequentially transmit the AP for each combination of a plurality of power transmission coil groups not interfering with each other. In a case where an object within the power-transmittable range has been detected, the TX transmits a DP based on the WPC standard. The DP can be transmitted using a power transmission coil by which the placed object has been detected through transmission of the AP. Subsequently to S502, the process flow proceeds to S503.

In S503, the TX determines whether an RX is placed thereon. This determination is performed by determining whether a predetermined response to the DP has been received. In a case where a response to the DP has been received, the TX determines that the detected object is an RX and the RX has been placed on the TX, and then the process flow proceeds to S504. In a case where a predetermined response to the DP has not been received, the TX determines that the detected object is not an RX and an RX has not been placed on the TX, and then the process flow proceeds to S501.

In S504, the TX stores an identifier of the power transmission coil having transmitted the DP in the memory. The identifier includes identification information for identifying the power transmission coil in the corresponding power transmission coil group. Here, the TX can identify a power transmission area using the identifier on the basis of the arrangement relationship between the power transmission coils and the power transmission areas stored in advance. Then, the process flow proceeds to S505.

In S505, the TX acquires identification information and capacity information from the RX through communication in the configuration phase specified in the WPC standard. The identification information of the RX includes a manufacturer code and a basic device ID. The capacity information of the RX includes the following information.

Information for identifying a corresponding version of the WPC standard

A maximum power value which is a value for identifying maximum power which can be supplied to a load from the RX Information indicating whether a negotiation function based on the WPC standard is provided This information is an example, and the identification information and the capacity information of an RX may be replaced with other information or may additionally include other information. For example, the identification information may be arbitrary other identification information for identifying the identity of the RX such as a wireless power ID. The TX may acquire the identification information and the capacity information of the RX using a method other than communication in the configuration phase based on the WPC standard. Then, the process flow proceeds to S506.

In S506, the TX performs a negotiation process with the RX through communication in the negotiation phase specified in the WPC standard and determines a GP value. Alternatively, in S506, the process of determining the GP value is performed using a method other than communication in the negotiation phase based on the WPC standard.

Alternatively, for example, in a case where information indicating that the RX does not correspond to the negotiation phase has been acquired in S505, the TX determines the GP value to a predetermined value without performing communication in the negotiation phase. The predetermined value is, for example, a value which is specified in advance in the WPC standard. Then, the process flow proceeds to S507.

In S507, the TX transitions to the calibration phase based on the WPC standard and calculates a reference value (a threshold value) of a power loss on the basis of a received power value of the RX. In the calibration phase, the TX derives a relationship of the received power value with respect to the transmitted power value in a state in which there is no foreign object.

The TX derives data indicating a power loss between the TX and the RX in a state in which there is no foreign object using a predetermined received power value acquired from the RX on the basis of the WPC standard. For example, the predetermined received power value includes a received power value in a light load state and a received power value in a connected load state.

In a foreign object detecting process based on a power loss method, a power loss between the TX and the RX during power transmission is calculated on the basis of the received power value of the RX received during the power transmission from the derived relationship of the received power value with respect to the transmitted power value. The power loss is compared with a threshold value, and is the TX determines that "there is a foreign object" or "there is a high likelihood that there is a foreign object" in a case where the power loss is equal to or greater than the threshold value. Subsequently to S507, the process flow proceeds to S508.

In S508, the TX starts transmission of power to the RX. The power transmission is performed through a process in the power transfer phase. The present disclosure is not limited thereto, and the power transmission may be performed using a method other than the WPC standard. Subsequently, in S509, the TX performs an NFC tag detecting process, and the process flow proceeds to S510.

The NFC tag detecting process can be periodically performed in parallel with the power transmission. In S510, the TX determines whether the power transmission is to stop. In a case where it is determined that the power transmission is to stop, the TX ends the process flow and returns the process flow to the initial state. In a case where it is determined that the power transmission is not to stop, the process flow proceeds to S508, and the TX continues to perform the power transmission.

In a case where an end power transfer (EPT) packet based on the WPC standard has been received from the RX, the TX ends the process flow in any phase on the basis of the WPC standard.

In a case where an NFC tag has been detected as a result of the NFC tag detecting process in the RX or in a case where the battery is fully charged, an EPT packet is also transmitted from the RX to the TX, and thus the process flow returns to an initial state. In this case, the process flow returns to the NFC tag detecting process (S501), but may return to the process (S502) in the ping phase.

In the example illustrated in FIG. 6, the NFC tag detecting process in the TX is performed before the process in the ping phase is performed (S502) and after the power transmitting process starts (S508), but may be performed in a process in any phase.

Various processes for power transmission and the NFC tag detecting process can be independently performed. For example, the NFC tag detecting process (S501) and the process in the ping phase (S502) may be simultaneously performed. The TX can stay in the initial state until it is detected that an NFC tag has been removed.

The processes of S501 and S509 in FIG. 6 will be described below with reference to FIG. 7. FIG. 7 is a flowchart illustrating an example of the NFC tag detecting process. In S700, the TX starts a process loop and selects a target NFC antenna, and then the TX detects an NFC tag in S701.

The NFC tag detecting process can be performed for each tag type in the order of Type-A, Type-B, and Type-F using a reader/writer function based on the NFC standard, but the present disclosure is not limited thereto. For example, the TX may sequentially detect an NFC tag using the NFC antennas for each NFC tag type. Subsequently to S701, the process flow proceeds to S702.

In S702, the TX determines whether an NFC tag has been detected using the selected NFC antenna. In a case where an NFC tag has been detected (YES in S702), the process flow proceeds to S703. In a case where an NFC tag has not been detected (NO in S702), the process flow proceeds to S706.

In S703, the TX determines whether power transmission to a power reception device is being performed in a power transmission area in which the NFC antenna by which the NFC tag has been detected is disposed. In a case where it is determined that power transmission to the power reception device is being performed in the power transmission areas (YES in S703), the process flow proceeds to S704.

On the other hand, in a case where it is determined that power transmission to the power reception device is not being performed in the power transmission areas (NO in S703), the process flow proceeds to S705. In S704, the TX stops the power transmission in the power transmission area.

For example, a process of stopping power transmission to the power reception device using a predetermined power transmission coil is performed. In S705, the TX stops transmission of an AP from the power transmission coils in the power transmission area. In a case where the process of S704 or S705 ends, the process flow using the target NFC antenna ends, and the process flow proceeds to S706.

In S706, the TX performs the processes of S701 to S705 on all the NFC antennas and determines whether the NFC tag detecting process has been completed. In a case where it is determined that the NFC tag detecting process has been completed, the TX ends this process flow and returns the process flow to the initial state.

In a case where it is determined that the NFC tag detecting process has not been completed, the process flow proceeds to S700, and the TX selects a next target NFC antenna and continues to perform the process flow (to perform the processes of S701 to S706).

Figure 8:
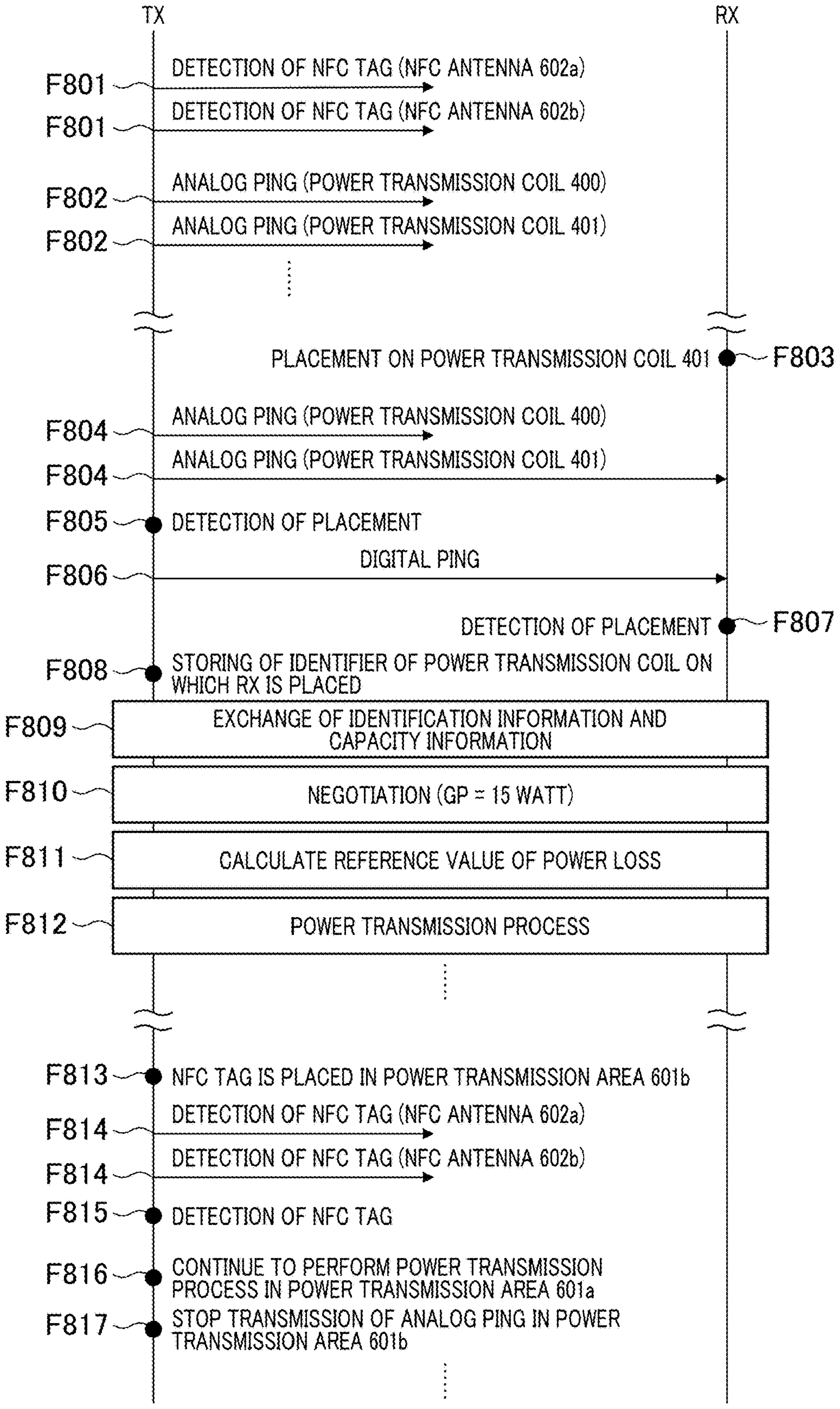
FIG. 8 is a sequence diagram illustrating operations of devices according to the first embodiment.

An example of operation sequences of the TX and the RX will be described below with reference to FIG. 8. FIG. 8 is a sequence diagram in which the operation sequence of the TX is illustrated in the left part and the operation sequence of the RX is illustrated in the right part. In an initial state, it is assumed that the RX is not placed on the TX.

The TX sequentially transmits an AP from the power transmission coils and starts the power transmission process after detecting that the RX has been placed thereon. Thereafter, it is assumed that an NFC tag is placed in a power transmission area other than the power transmission area on which the RX has been placed. In this case, the NFC tag is detected through the NFC tag detecting process. Here, since an NFC antenna by which the NFC tag has been detected is disposed in a power transmission area other than the power transmission area in which power transmission is being performed, the TX does not stop the power transmission.

In F801, the TX starts the NFC tag detecting process. This process corresponds to the process of S501 in FIG. 6. The TX sequentially detects an NFC tag in the NFC antennas 602*a* and 602*b* (FIG. 7: S701). Since no NFC tag is present at this time point, an NFC tag is not detected in any NFC antenna (NO in S702), and the NFC tag detecting process ends.

Then, in F802, the TX sequentially transmits an AP from the power transmission coils 400, 401, . . . and waits until an object is placed thereon. This corresponds to the process of S502 in FIG. 6. In F803, an RX is placed on the TX. In F804, the TX has sequentially transmitted an AP from the power transmission coils 400, 401, . . . , the AP changes. Accordingly, in F805, the TX detects that an object has been placed on the power transmission coil 401.

Then, the TX transmits a DP in F806, and the RX detects that the RX has been placed on the TX in F807. On the other hand, the TX detects that the placed object is the RX on the basis of a response to the DP.

This corresponds to a case in which the determination result of S503 in FIG. 6 is positive (YES), and the process flow proceeds to S504. In F808, the TX stores an identifier of the power transmission coil 401 corresponding to the area on which the RX is placed in the memory 207 (FIG. 6: S504). The TX can determine that the RX has been placed on the area 601*a* (the power transmission area) on the basis of the arrangement relationship between the power transmission coils and the power transmission areas stored in advance.

Subsequently, in F809, the TX performs a process of acquiring identification information and capacity information from the RX through communication in the configuration phase. This process corresponds to the process of S505 in FIG. 6. In F810, the TX and the RX perform communication in the negotiation phase.

This process corresponds to the process of S506 in FIG. 6. For example, the TX and the RX negotiate through communication and determine the GP value to be 15 (watt). In F811, the TX derives the relationship of the received power value with respect to the transmitted power value in a state in which there is no foreign object through communication in the calibration phase and calculates a reference value of a power loss. This process corresponds to the process of S507 in FIG. 6. In F812, the TX starts the process of transmitting power to the RX. This process corresponds to the process of S508 in FIG. 6.

Thereafter, in F813, an NFC tag is placed on the area 601*b* (the power transmission area) of the TX. The area 601*b* is an area corresponding to the NFC antenna 602*b*. In F814, the TX sequentially detects an NFC tag in the NFC antennas 602*a* and 602*b*. This process corresponds to the process of S509 in FIG. 6.

In F815, an NFC tag in the NFC antenna 602*b* is detected. This corresponds to a case in which the determination result of S702 in FIG. 7 is positive (YES). In F816, the TX determines that the NFC tag is located in the area 601*b* corresponding to the NFC antenna 602*b* and this area is different from the area 601*a* including the power transmission coil 401 which is performing power transmission to the RX.

Figure 7:
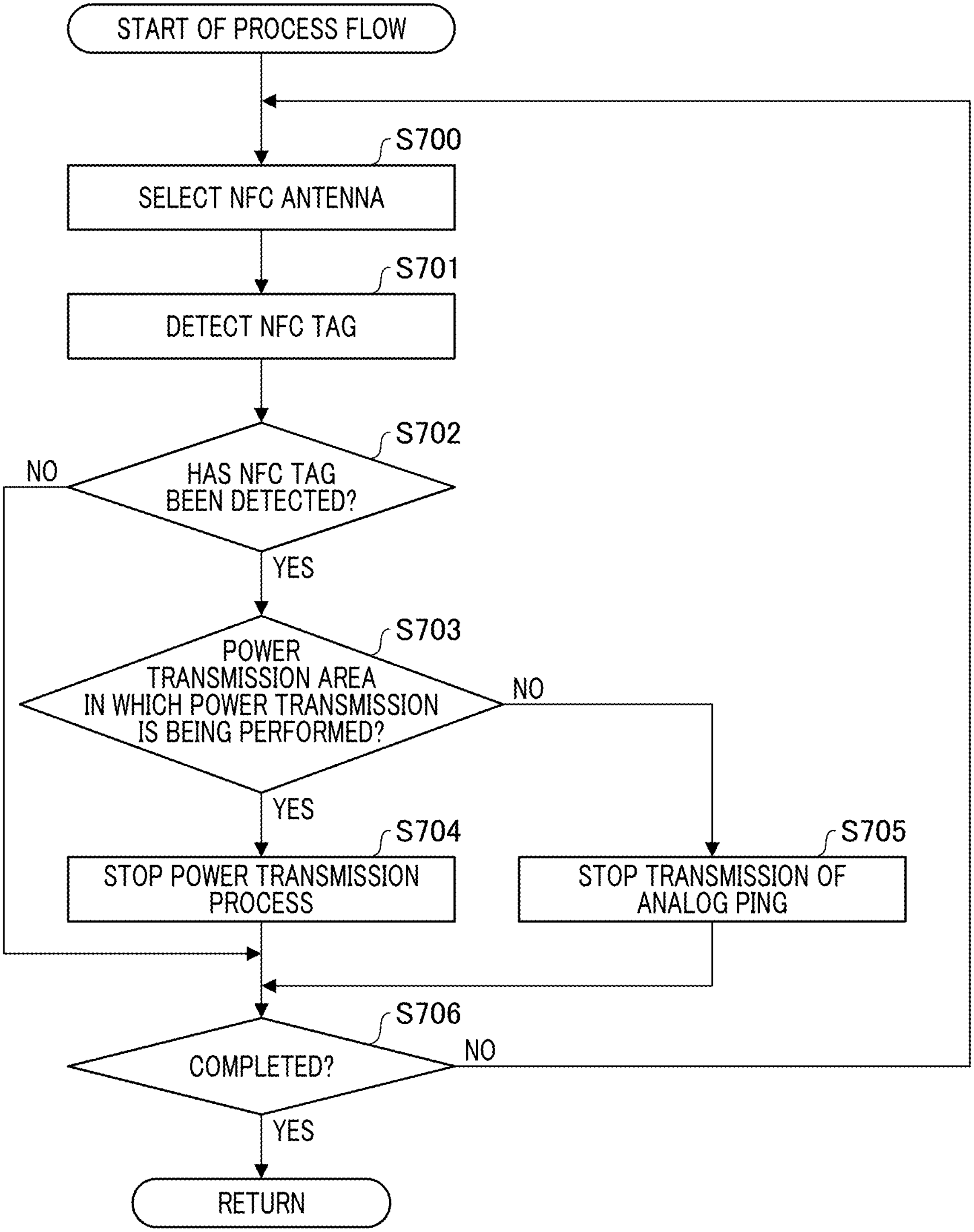
FIG. 7 is a flowchart illustrating an NFC tag detecting process according to the first embodiment.

This corresponds to a case in which the determination result of S703 in FIG. 7 is negative (NO), and the TX continues to perform power transmission to the RX. Then, in F817, the TX stops transmission of an AP from the power transmission coils in the area 601*b* corresponding to the NFC antenna 602*b* by which the NFC tag has been detected. The power transmission device 100 according to the present embodiment has a configuration in which a plurality of power transmission areas are provided and an NFC antenna is provided for each power transmission area. The power transmission device 100 sequentially performs the NFC tag detecting process on all the NFC antennas after starting power transmission to the power reception device.

In a case where power transmission in the power transmission area corresponding to the area in which the NFC antenna by which the NFC tag has been detected is provided is performed as a result of the NFC tag detection, control for limiting power transmission is performed, but power transmission which is being performed in another power transmission area is not limited.

The control for limiting power transmission includes control for stopping power transmission or control for decreasing power to be transmitted. Accordingly, even in a case where an NFC tag is placed on the power transmission device 100, it is possible to continuously perform power transmission in a power transmission area in which there is a low likelihood that destruction or heating of the NFC tag, interference with power transmission, or the like occurs.

Accordingly, it is possible to curb unnecessary stopping or limiting of power transmission. In a case where the power transmission area in which the NFC antenna by which the NFC tag has been detected is provided is a power transmission area other than the power transmission area in which power transmission is being performed, control for stopping transmission of a ping (transmission of an AP) from a power transmission coil in that power transmission area is performed.

Accordingly, it is possible to curb power transmission in a power transmission area in which there is a high likelihood that destruction or heating of the NFC tag or the like occurs and to realize a wireless power transfer system with higher safety and higher efficiency.

In the present embodiment, a process of detecting a device (an electronic tag) that is able to communicate via a communication antenna (an NFC antenna) provided in an area in which power transmission using a power transmission coil is possible is performed. For example, in a case where a power reception device is placed on the power transmission device, the power transmission device stores information indicating the area in which the power reception device has been detected using the power transmission coil.

In a case where the antenna in which the device has been detected is an antenna provided in an area corresponding to the stored information, the power transmission device performs control for limiting power transmission. That control is control for stopping power transmission or control for decreasing power to be transmitted.

According to the present embodiment, it is possible to provide a technique of appropriately detecting a predetermined device and enabling power transmission control in a power transmission device including a plurality of power transmission coils for performing wireless power transfer and a communication antenna.

Modified Examples of First Embodiment

A modified example is different from the first embodiment in which one NFC antenna is provided for each power transmission area of a TX in arrangement of NFC antennas. For example, the modified example employs a configuration in which two or more NFC antennas are provided for each power transmission area.

There are a configuration in which one NFC antenna is provided for each power transmission coil and a configuration in which one NFC antenna is provided for each group of a plurality of neighboring power transmission coils which are simultaneously used for power transmission to a power reception device.

There is a configuration in which two or more NFC antennas are provided for each area including a target power transmission coil and a power transmission coil interfering with the target power transmission coil. Alternatively, there is a configuration in which an NFC antenna other than an NFC antenna provided in each power transmission area is provided in an area including a power transmission coil shared by the power transmission areas.

Accordingly, since the TX can determine whether power transmission is to stop for each smaller area or determine whether power to be transmitted is to decrease in a case where an NFC tag is placed on the TX, it is possible to continuously perform power transmission with a higher probability.

Second Embodiment

A second embodiment of the present disclosure will be described below. In the present embodiment, an example of a power transmission device including only a first power transmission circuit 203 and a first communication unit 204 as a power transmission circuit and a communication unit will be described.

Description of the same details in the present embodiment as in the first embodiment will be omitted, and differences will be mainly described. This omission of description is true of embodiments or modified examples which will be described later.

An arrangement example of power transmission coils and NFC antennas according to the present embodiment will be described below with reference to FIG. 9. It is assumed that the first power transmission circuit 203 according to the present embodiment can be connected to all the power transmission coils 400 to 411.

Figure 9:
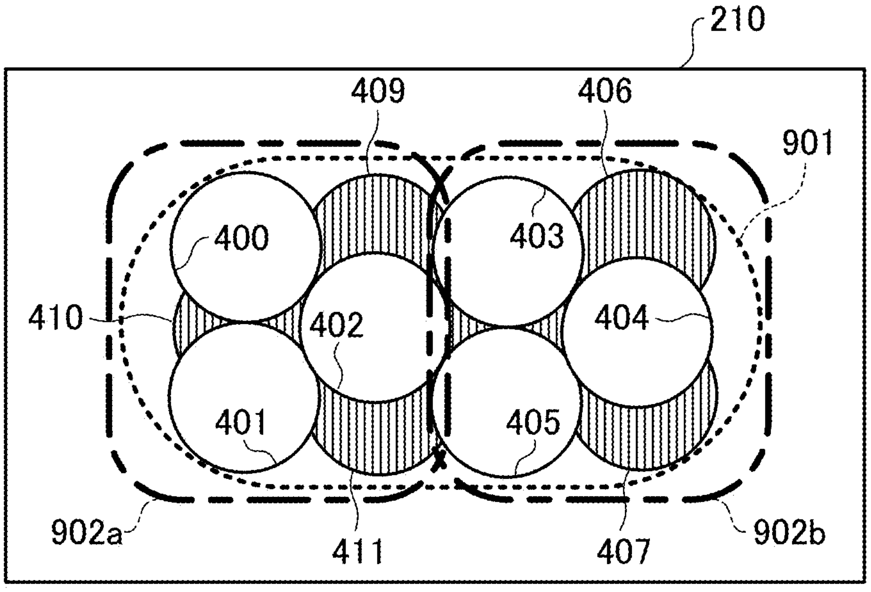
FIG. 9 is a diagram illustrating an example of an arrangement of power transmission coils and NFC antennas according to a second embodiment.

In a case where seen in a direction perpendicular to a plane including the power transmission coils, an area 901 indicated by a dotted line in FIG. 9 is an area including the power transmission coils 400 to 411 and corresponds to a power transmission area. Accordingly, the first power transmission circuit 203 can transmit power to the power reception device 101 placed in the area 901. It is possible to transmit power to a maximum one power reception device with the area 901. That is, the TX can transmit power to a total of one power reception device.

In FIG. 9, NFC antennas are schematically indicated by alternated long and short dash lines in the power transmission coils and the power transmission area. The NFC antenna 902*a* is disposed to surround a power-transmittable range of the power transmission coils 400, 401, 402, 409, 410, and 411 in the area 901.

The NFC antenna 902*b* is disposed to surround a power-transmittable range of the power transmission coils 403, 404, 405, 506, 407, and 408 in the area 901. Two or more NFC antennas can be disposed in the same power transmission area. Accordingly, it is possible to perform independent NFC tag detection in two or more ranges into which the power transmission area is divided, and the TX can perform appropriate control in a case where an NFC tag has been detected.

Figure 10:
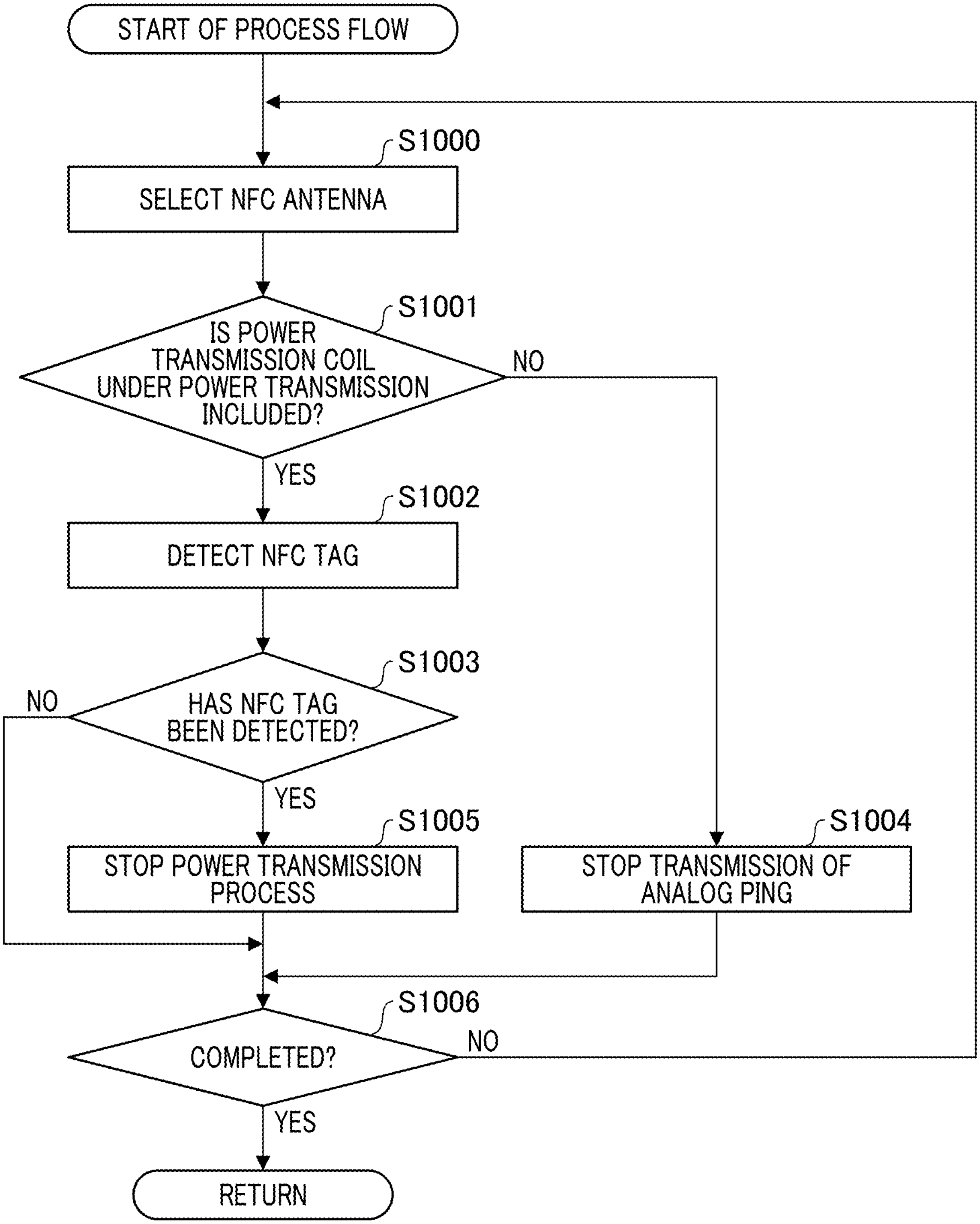
FIG. 10 is a flowchart illustrating an NFC tag detecting process according to the second embodiment.

The processes of S501 and S509 which are performed by the TX in the present embodiment will be described below with reference to FIGS. 6 and 10. The processes of S502 to S508 and S510 are the same as in the first embodiment, and thus description thereof will be omitted. FIG. 10 is a flowchart illustrating an example of a flow of the NFC tag detecting process. In S1000, the TX selects a target NFC antenna, and then the process flow proceeds to S1001.

In S1001, the TX determines whether a power transmission coil which is performing power transmission is included in an area corresponding to the NFC antenna. In a case where it is determined that a power transmission coil which is performing power transmission is included in that area (YES in S1001), the process flow proceeds to S1002. In a case where it is determined that a power transmission coil which is performing power transmission is not included in that area (NO in S1001), the process flow proceeds to S1004.

In S1002, the TX detects an NFC tag. Then, in S1003, the TX determines whether an NFC tag has been detected. In a case where an NFC tag has been detected (YES in S1003), the process flow proceeds to S1005. On the other hand, in a case where an NFC tag has not been detected (NO in S1003), the process flow proceeds to S1006.

In S1004, the TX stops transmission of an AP from the power transmission coils present in the area corresponding to the target NFC antenna and ends the process flow for the target NFC antenna. In S1005, the TX stops the power transmission process, and the TX ends the process flow for the target NFC antenna. Subsequently to S1004 to S1005, the process flow proceeds to S1006.

In S1006, the TX performs the processes of S1001 to S1005 on all the NFC antennas and determines whether the NFC tag detecting process has been completed.

In a case where the TX determines that the NFC tag detecting process has been completed, the process flow ends and returns to the initial state. In a case where it is determined that the NFC tag detecting process has not been completed, the process flow proceeds to S1000, and the TX selects a next target NFC antenna and continues to perform the process flow (performs the processes of S1001 to S1006).

Figure 11:
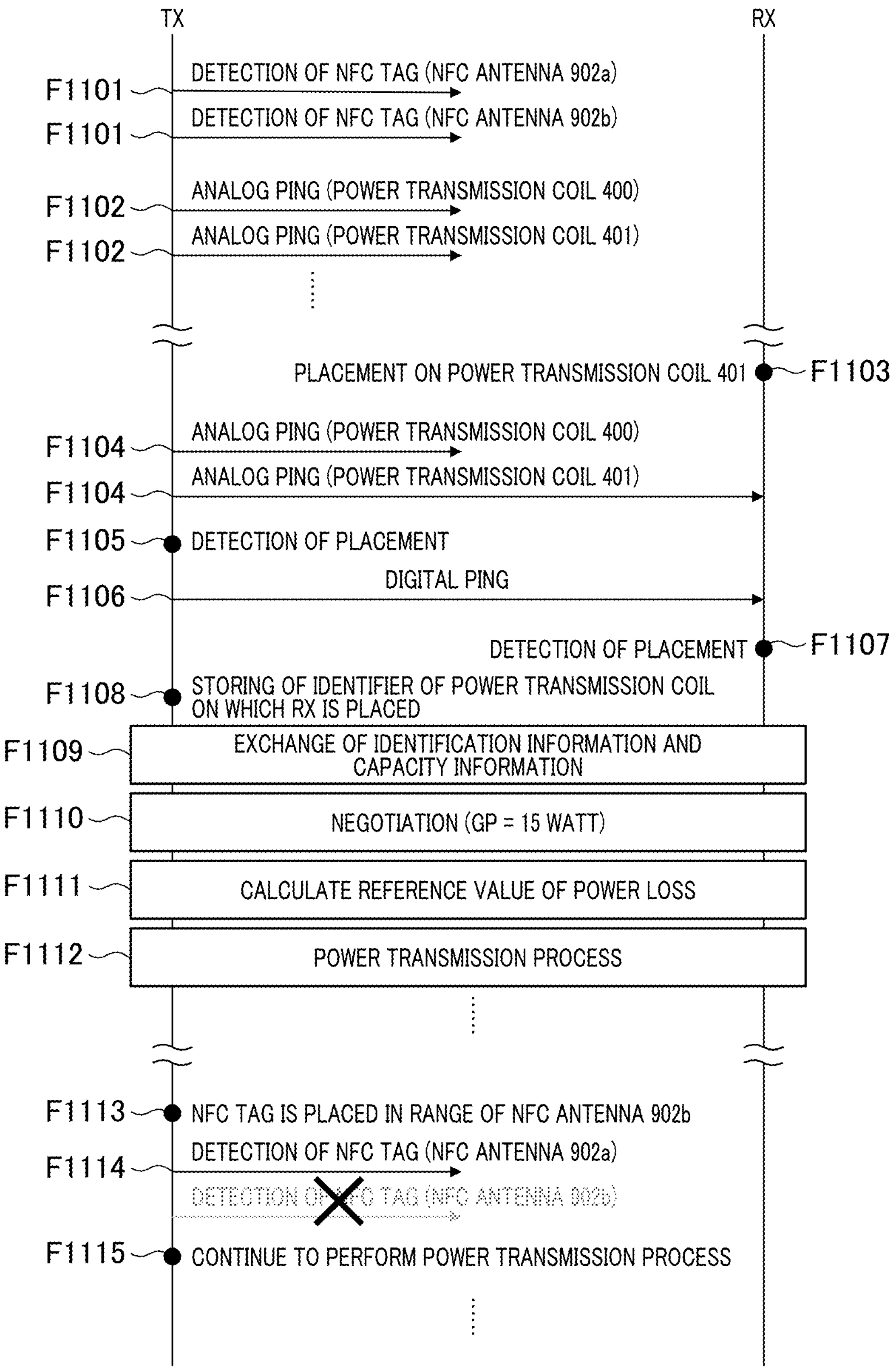
FIG. 11 is a sequence diagram illustrating operations of devices according to the second embodiment.

Operation sequences of a TX and an RX according to the present embodiment will be described below with reference to FIG. 11. In a state in which an RX is not placed on a TX, the TX sequentially transmits an AP from the power transmission coils.

In a case where placement of an RX is detected, the TX starts a power transmission process. Thereafter, an NFC tag is placed in an area of an NFC antenna provided in an area not including a power transmission coil which is transmitting power to the RX.

In this case, the TX does not perform NFC tag detection using that NFC antenna and thus does not stop power transmission. The operations of F1101 to F1112 are the same as F801 to F812 except the reference sign of the NFC antennas in FIG. 8, and thus description thereof will be omitted.

In F1113, an NFC tag is placed in a range corresponding to the NFC antenna 902*b* in the TX. In F1114, the TX detects an NFC tag using only the NFC antenna 902*a* because the power transmission coil 401 which is transmitting power is present in the area corresponding to the NFC antenna 902*a*.

This process corresponds to the process of S1002 in FIG. 10. In F1115, the TX continues to perform the power transmission process to the RX. On the other hand, the TX stops transmission of an AP from the power transmission coils in the area corresponding to the NFC antenna 902*b*. This process corresponds to the process of S1004 in FIG. 10.

In the present embodiment, a configuration in which two or more NFC antennas with a smaller size than one power transmission area are provided in the power transmission area of the power transmission device is employed. The power transmission device detects an NFC tag using only the NFC antenna corresponding to the area including the power transmission coil which is transmitting power after power transmission to the power reception device has been started.

Accordingly, even in a case where an NFC tag is placed on the power transmission device, it is possible to continuously perform power transmission in an area in which there is a low likelihood that destruction or heating of the NFC tag, interference with power transmission, or the like occurs. Accordingly, it is possible to curb unnecessary stopping or limiting of power transmission.

The power transmission device stops transmission of an AP from a power transmission coil outside of an area of a specific NFC antenna corresponding to the area including the power transmission coil which is transmitting power. Accordingly, it is possible to curb unnecessary power transmission and to realize a wireless power transfer system with higher safety and higher efficiency.

Modified Examples of Second Embodiment

Regarding a plurality of NFC antennas in a power transmission device (TX), there are a first method of disposing the NFC antennas to overlap each other and a second method of disposing the NFC antennas not to overlap each other. In the present disclosure, the first or second method can be performed.

Alternatively, the first method may be performed in a part of an NFC antenna group, and the second method may be performed in the other part of the NFC antenna group. For example, the following configurations can be employed as modified examples.

- Configuration in which one NFC antenna is provided for each power transmission coil
- Configuration in which one NFC antenna is provided for each group of a plurality of neighboring power transmission coils simultaneously used for power transmission to an RX
- Configuration in which one NFC antenna is provided for each area including a target power transmission coil and a power transmission coil interfering with the target power transmission coil.

According to the modified examples, since whether NFC tag detection is to be performed can be set for each smaller area, it is possible to curb unnecessary stopping or limiting of power transmission with a higher probability.

Other Modified Examples

Modified examples of the first and second embodiments will be described below. In a case where an NFC tag has been detected using an NFC antenna corresponding to an area including a power transmission coil which is transmitting power, a TX according to the modified examples does not stop the power transmission process but limits the power transmission.

For example, the TX performs control or setting for changing a transmitted power value to a sufficiently small value (equal to or less than 5 watt). The TX determines whether to limit power transmission on the basis of a result of NFC tag detection and a detection result based on an arbitrary state detecting method (which includes a foreign object detecting method) other than the NFC tag detection.

Examples of the state detecting method include a state detecting method based on a quality factor (Q-value, Q-factor) associated with the power transmission coils, a state detecting method based on a difference between a transmitted power value and a received power value, and a state detecting method based on an index indicating attenuation of a power transmission wave.

Alternatively, the examples may further include a state detecting method based on an index indicating an electromagnetically coupled state between power transmission coils of the TX and power reception coils of the RX, a state detecting method based on the temperature of the TX or the RX, and a state detecting method based on a current flowing in the power transmission coil or the power reception coil.

The limiting of power transmission includes a decrease in transmitted power of the TX, a decrease in received power of the RX, or change to a transmitted power value or a received power value within a predetermined range based on negotiation between the TX and the RX.

In the first and second embodiments, the TX sequentially performs the NFC tag detecting process for each NFC antenna. In the modified examples, the NFC tag detecting process is performed in parallel using a plurality of NFC antennas which can be simultaneously controlled.

Accordingly, in a case where an NFC tag is placed on the TX, it is possible to detect the NFC tag in a shorter period of time and to realize a wireless power transfer system with higher safety and higher efficiency.

In the first and second embodiments, the TX periodically performs the NFC tag detecting process. In the modified example, the TX performs the NFC tag detecting process with a trigger different from that in the embodiments.

For example, the TX monitors a change in impedance value in an NFC antenna and performs the NFC tag detecting process in a case where the change is greater than a threshold value. Accordingly, it is possible to curb an unnecessary tag detecting process in a situation in which there is a low likelihood that an NFC tag is placed and to realize a wireless power transfer system with higher safety and higher efficiency.

In the first embodiment and the second embodiment, the TX continues to perform power transmission to an RX in a case where an NFC tag has not been detected as a result of the NFC tag detecting process. In the modified examples, the TX performs the aforementioned arbitrary state detecting methods (which include a foreign substrate detecting method) in a case where an NFC tag has not been detected.

For example, the TX determines whether there is a state abnormality (whether there is a foreign object) or a likelihood thereof (a probability that there is a foreign object) and determines whether to continue to perform power transmission to an RX. It is possible to detect a foreign object which has not been detected in the NFC tag detecting process in a shorter period of time and to realize a wireless power transfer system with higher safety and higher efficiency.

In the embodiments, wireless communication specified in an NFC standard is used to detect an electronic tag. The present disclosure is not limited to this example, and non-contact/short-range radio communication such as a radio frequency identifier (RFID) may be used.

In this case, an NFC tag can be replaced with an IC tag, an IC card, an RF tag, an RF card, or the like. The electronic tag is an example of a device that can communicate with a TX via a predetermined antenna, and the embodiments of the present disclosure can be applied to various electronic devices that can wirelessly communicate with a TX.

Other Embodiments

The present disclosure can also be realized by a process in which a program for realizing one or more functions of the aforementioned embodiments is provided to a system or a device via a network or a storage medium and one or more processors in a computer of the system or the device read and execute the program. The present disclosure can also be realized by a circuit (for example, an ASIC) for realizing one or more functions.

The present disclosure includes, for example, realization of the functions of the aforementioned embodiments using at least one processor or circuit. Distributed processing may be performed using two or more processors.

What is claimed is:

1. A power transmission device comprising:

a power transmitting unit configured to perform power transmission using a plurality of power transmission coils;

a first detection unit configured to detect a power reception device using a power transmission coil included in the plurality of power transmission coils;

a communication antenna disposed in an area in which power transmission is possible using the power transmission coil;

a second detection unit configured to detect a device able to communicate via the antenna; and a control unit configured to control power transmission via the power transmitting unit using the power transmission coil by which the power reception device has been detected, wherein the control unit performs control to limit power transmission from the power transmitting unit in a case where power transmission to the power reception device is being performed using the power transmission coil in the area in which the antenna with which the device has been detected by the second detection unit is disposed.

2. The power transmission device according to claim 1, further comprising a storage unit configured to store information indicating the area in which the power reception device has been detected by the first detection unit, wherein the control unit performs control to limit power transmission via the power transmitting unit in a case where the antenna with which the device has been detected by the second detection unit is an antenna disposed in an area corresponding to the information stored in the storage unit.

3. The power transmission device according to claim 2, wherein the control unit does not perform a process of detecting the device, by the second detection unit, using the antenna disposed in the area corresponding to the information stored in the storage unit.

4. The power transmission device according to claim 1, wherein a first area in which the antenna with which the device has been detected by the second detection unit is disposed is an area including a second area in which power transmission is possible using the power transmission coils in a case where seen in a direction perpendicular to a surface including the power transmission coils, and wherein the control unit performs control for stopping detection by the first detection unit using the power transmission coils in the second area in a case where power transmission from the power transmission coils to the power reception device is not being performed in the second area.

5. The power transmission device according to claim 1, further comprising a plurality of antennas, and wherein each of the plurality of antennas is disposed in an area including an area in which power transmission is possible using a power transmission coil group including a plurality of power transmission coils in a case where seen in a direction perpendicular to a surface including the power transmission coils.

6. The power transmission device according to claim 5, further comprising first and second power transmission coils group of which each includes a plurality of power transmission coils, wherein, in a case where seen in the direction perpendicular to a surface including the power transmission coils, the first and second power transmission coil groups overlap each other, a first antenna out of the plurality of antennas is disposed in an area including an area corresponding to the first power transmission coil group, and a second antenna is disposed in an area including an area corresponding to the second power transmission coil group.

7. The power transmission device according to claim 1, further comprising a power transmission coil group including the plurality of power transmission coils and a plurality of antennas, wherein, in a case where seen in a direction perpendicular to a surface including the power transmission coils, the plurality of power transmission coils overlap each other and each of the plurality of antennas is disposed in an area including a part of an area in which power transmission is possible using the power transmission coil group.

8. The power transmission device according to claim 1, further comprising a plurality of antennas, and wherein the second detection unit simultaneously detects the device using the plurality of antennas.

9. The power transmission device according to claim 3, wherein the control unit performs control such that the power transmitting unit continues to perform a process for power transmission using the power transmission coils in an area different from the second area in a case where power transmission to the power reception device is not being performed using the power transmission coils in the second area.

10. The power transmission device according to claim 1, wherein the device is an electronic tag based on a predetermined standard, and wherein the second detection unit detects the electronic tag using a reader/writer function in the standard.

11. A control method performed by a power transmission device including a plurality of power transmission coils, the control method comprising:

performing power transmission using a power transmission coil included in the plurality of power transmission coils;

detecting a power reception device using the power transmission coil;

detecting a device able to communicate via a communication antenna disposed in an area in which power transmission is possible using the power transmission coil; and limiting power transmission via the power transmission coil in a case where power transmission to the power reception device is being performed via the power transmission coil in an area in which the antenna with which the device has been detected is disposed.

12. A storage medium storing a computer program causing a computer of a power transmission device including a plurality of power transmission coils to perform a method, the method comprising:

performing power transmission using a power transmission coil included in the plurality of power transmission coils;

detecting a power reception device using the power transmission coil;

detecting a device able to communicate via a communication antenna disposed in an area in which power transmission is possible using the power transmission coil; and limiting power transmission via the power transmission coils in a case where power transmission to the power reception device is being performed via the power transmission coil in an area in which the antenna with which the device has been detected is disposed.

* * * * *